Aug. 9, 1949.

C. L. MOURFIELD 2,478,301

CAMERA FOR MAKING SIMULTANEOUS
EXPOSURES ON SEPARATE FILMS

Filed Aug. 25, 1947

Carl L. Mourfield
INVENTOR.

BY

ATTORNEY

Aug. 9, 1949.

C. L. MOURFIELD 2,478,301

CAMERA FOR MAKING SIMULTANEOUS
EXPOSURES ON SEPARATE FILMS

Filed Aug. 25, 1947

Carl L. Mourfield
INVENTOR.

BY

ATTORNEY

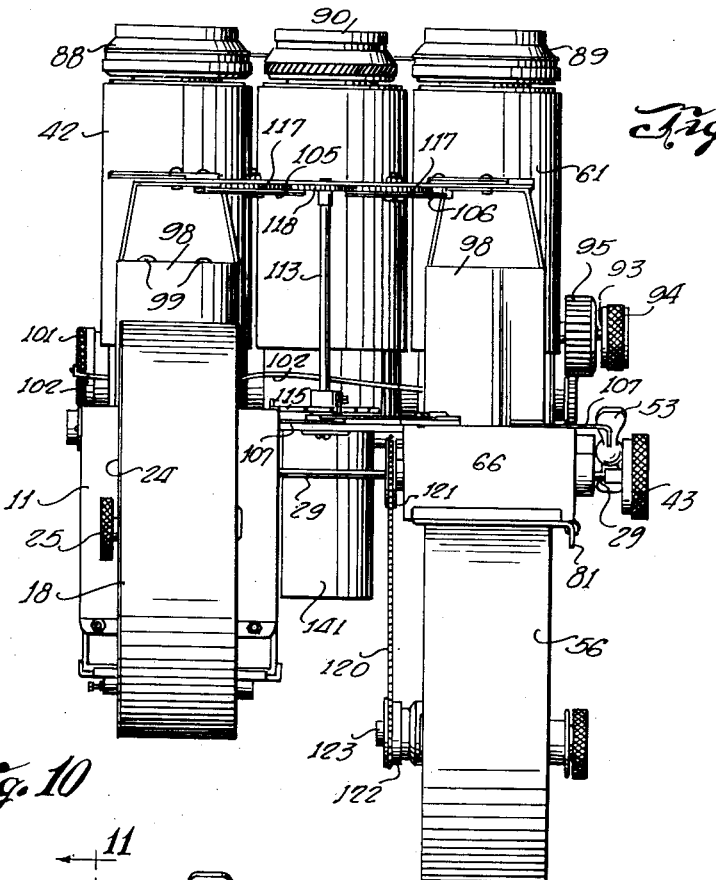
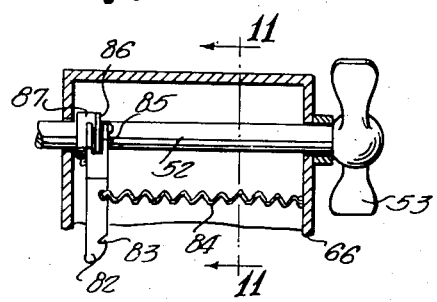
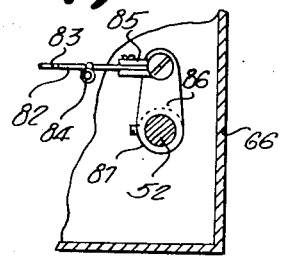
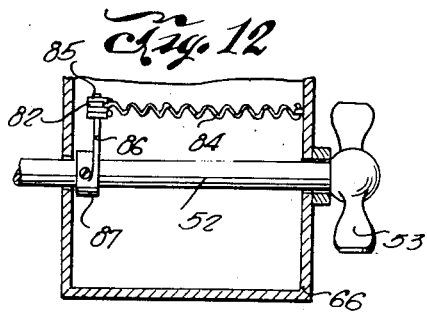

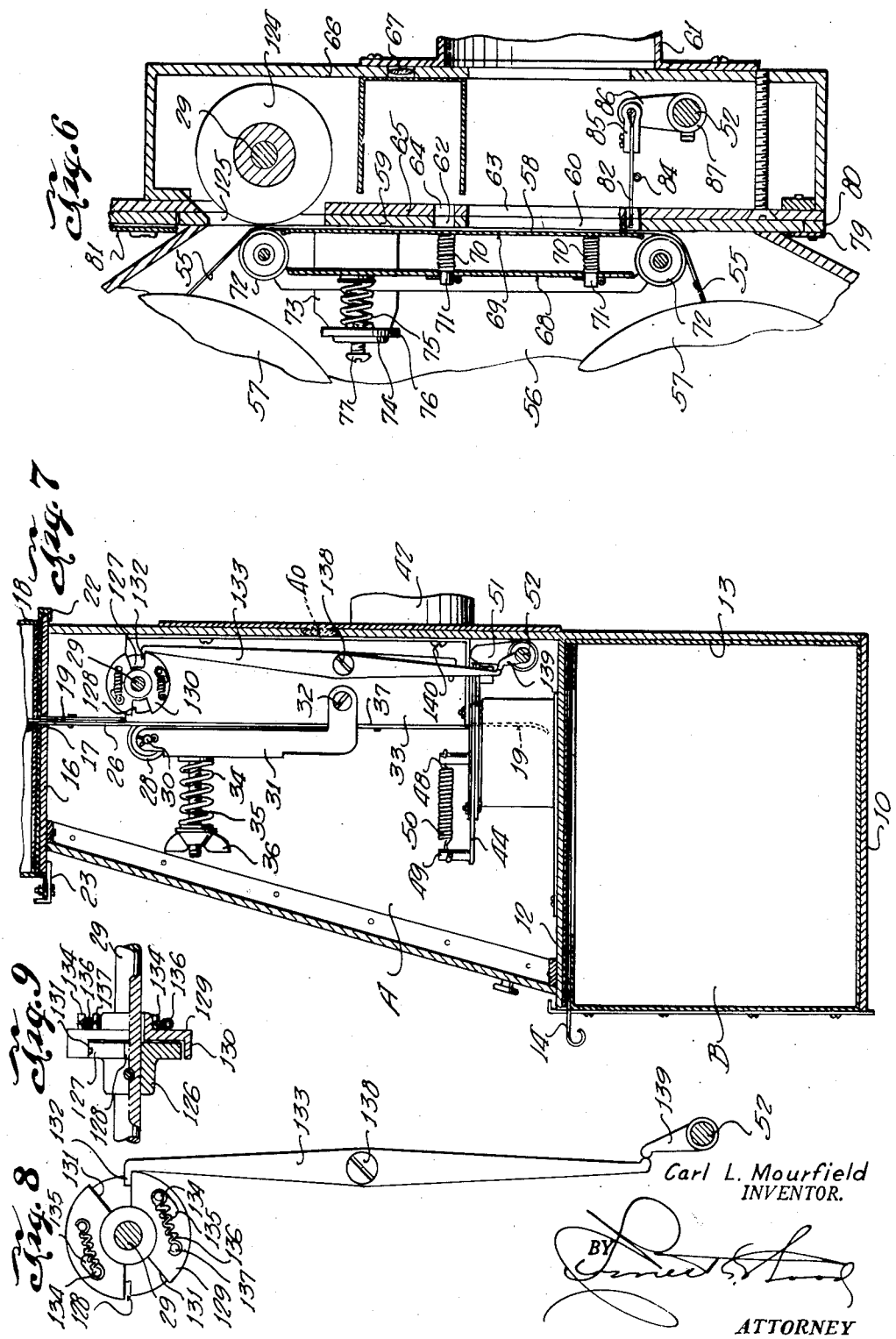

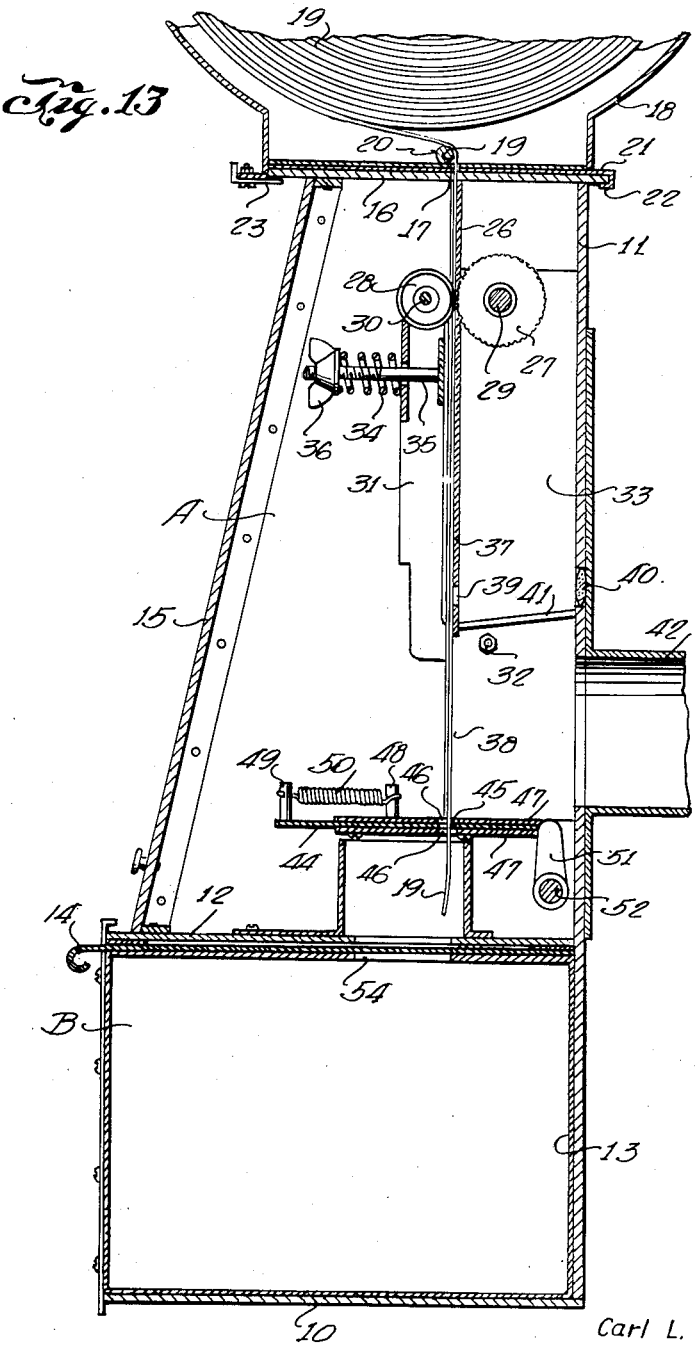

Patented Aug. 9, 1949

2,478,301

UNITED STATES PATENT OFFICE 2,478,301

CAMERA FOR MAKING SIMULTANEOUS EXPOSURES ON SEPARATE FILMS

Carl L. Mourfield, Dallas, Tex., assignor of one-fourth to M. W. Teplow, Dallas, Tex.

Application August 25, 1947, Serial No. 770,391

8 Claims. (Cl. 95—18)

This invention relates to photographic equipment and particularly to cameras.

The principal object of the invention is to provide a camera so designed and constructed that two exposures can be made simultaneously, one on positive photographic paper film and the other on negative photographic film through the medium of separate photographic lenses whose positive focusing is effected by an intermediate viewing lens.

In conventional portrait photography, it is the practice to take several different poses of a subject on a photographic film or plate and from which contact prints are subsequently made on photosenitized paper, serving as proofs, from which a customer may select the desired pose or poses, the later being reproduced through the film or plates on the more permanent photographic paper. The making of the proofs requires a period of time during which the customer may decide against accepting the pictures or he may be unavailable, resulting in a loss to the photographer. It is the chief object of the present invention to afford a photographer with a medium by which he may submit proofs of several poses to a customer before he departs from the studio and which, by comparison, are more lasting than conventional proofs which latter fade rapidly when exposed to light and are quickly rendered illegible by finger marks. The invention further effects a saving in costs by eliminating extra work and material on unselected poses.

Still another object of the invention is to provide means for identifying several exposures by serial numbers on both negative and positive films for customer selection and future reference.

Yet another object of the invention is to provide means for notching the negative film between each frame or exposure as a guide in cutting to preclude cuts through exposures. Moreover, a locking mechanism is provided and actuated by a film feeding knob to insure the presence of a complete frame for each exposure to avoid the possibility of double exposures and cooperating with the film feeding knob in a paper film cutter whose actuation must precede that of the knob to disengage the locking mechanism to permit another frame to be fed into the camera.

Still another object of the invention is to provide film magazines which are sealed against light infiltration and containing driving mechanisms from advancing film, yet permitting the magazines to be attached to and detached from the camera without affecting the film in any manner. Thus, film leaders ordinarily required in loading a camera are obviated.

With the foregoing objects in view, the invention has further reference to certain features of accomplishment which will become apparent as the description proceeds, taken in connection with the accompanying drawings wherein:

Figure 3 is a top plan view.

Figure 6 is a vertical sectional view through the negative film passage of the camera, taken on line 6—6 on Figure 1.

Figure 7 is a vertical sectional view through the positive film passage in advance of the film, taken on line 7—7 on Figure 1 to show the film locking mechanism.

Figure 8 is a detail side elevational view of the locking mechanism.

Figure 9 is a detail view, partly in section, showing the clutch of the locking mechanism.

Figure 10 is a fragmentary plan view of the positive film cutting shaft showing the negative film notching device.

Figure 11 is a view in vertical section, taken on line 11—11 on Figure 10.

Figure 12 is a front elevational view of the film notching device, and

Figure 13 is a vertical sectional view through the positive film passage taken on line 13—13 on Figure 1.

Figure 1:
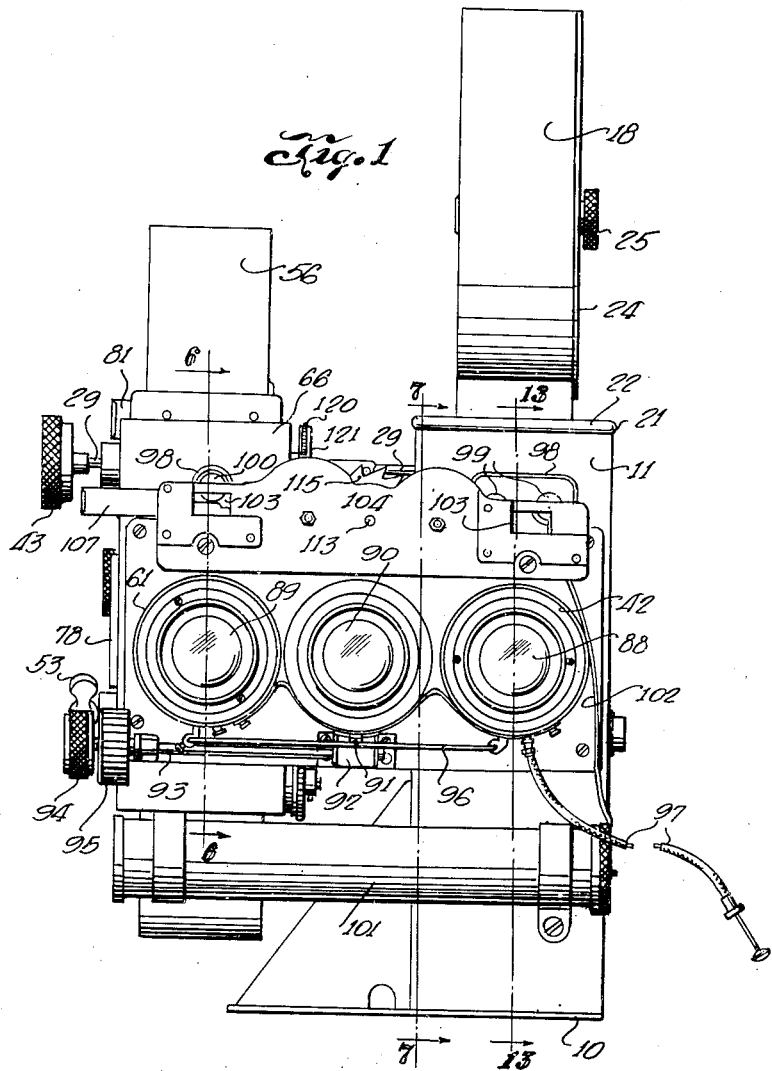
Figure 1 is a front elevational view of a camera constructed according to the present invention.
Figure 2:
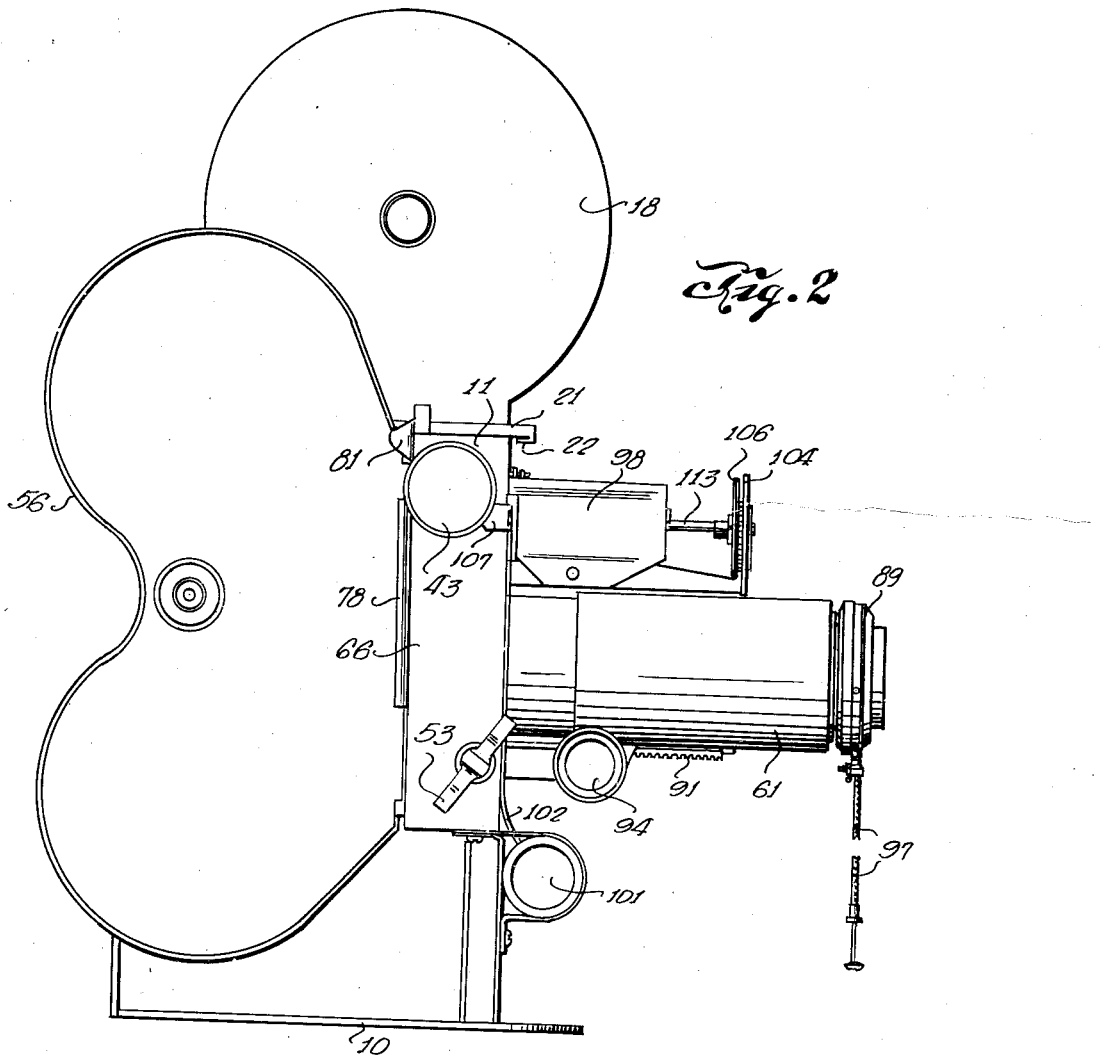
Figure 2 is a side elevational view.

Continuing with a more detailed description of the drawings, reference is primarily made to Figures 1 to 3 in which numeral 10 denotes a base for the camera suitable for mounting on a stand, tripod or otherwise and on this base is disposed a housing 11, divided into upper and lower compartments A and B by a horizontal partition 12. The partition 12 is adapted to snugly receive a transfer drawer or box 13 from which all light is excluded, when removed, by a light proof slide 14, for the purpose to be later set forth. A closure plate 15 covers the upwardly convergent rear of the chamber A and affords convenient access to the mechanism contained in this chamber.

The top 16 of the housing 11 extends beyond the latter at the front and rear and in the center thereof is a slot 17. A circular film magazine 18 is disposed on the top 16 of the housing 11 and contains a roll of positive paper film 19, the latter being threaded over a stationary roll 20 in the magazine 18 and through the slot 17 of top 16 into the chamber A.

The magazine 18 has a base flange 21, the latter having formed on its forward edge a return flange 22 which receives the extended edge of the top 16 of the housing 11. The opposite or rearward edge of the base flange 21 is flush with the subjacent extended edge of the top 12 and carries a pair of pivoted latch members 23 which are moved to underlie the said extended edge of the top 16 thus to secure the magazine 18 securely on the housing 11. A plate 24, secured by means of a nut 25 serves to close one side of the magazine 18 against infiltration of light which would otherwise expose the paper film 19.

Communicating with the slot 17 in the top 16 is a vertical film guide 26, on each side of which are pairs of rollers 27 and 28. The rollers 27 are mounted on a shaft 29, to which latter further reference will be made presently, and the surfaces of the rollers 27 are roughened for better frictional engagement with the edges of film 19 which these rollers are influential in advancing downwardly in the guide 26.

The rollers 28 are smooth-surfaced and are mounted on a shaft 30, journaled in the upper portion of a frame 31, the latter being pivoted at 32 at its lower end to parallel walls 33 within the chamber A. The purpose in pivoting the frame 31 is to vary the degree of frictional engagement of rollers 28 with the film 19. This is accomplished through a coiled spring 34 bearing on the frame 31, said spring being retained by a screw 35, threaded to receive a wing nut 36 by which tension on the spring is increased or decreased.

Adjacent the lower end of a film guide plate 37, which is a continuation of the film guide 26 thereabove, there is provided an exposure orifice 38 (Fig. 13). It will be observed that the film 19 traverses this orifice as it is caused to move downwardly through chamber A. Immediately above the orifice 38 is a slot 39 in the plate 37. It will become apparent presently how the exposure is serially numbered through the slot 29. A small lens 40, to intensify the light through this slot is mounted in the front wall of housing 11 as seen in Figure 13. It will also be observed that the slot 39 is isolated from the exposure orifice 38 by means of a partition 41, to exclude light therefrom.

After that portion of the film 19 lying over orifice 38 has been exposed by light admitted through the lens barrel 42 upon actuating the dual shutters of the camera, the film is advanced by rotating the feeding knob 43 at the right of the machine which is mounted on the shaft 29. However, for reasons to be presently explained, the knob 43 cannot be turned to present an unexposed portion of film to the orifice 38 until the already exposed frame has been severed. This has a definite bearing on the behavior of the operating mechanism of the photographic negative film which will be described presently.

To cut the positive paper film 19, there is provided a plate 44 (Fig. 13) having an opening 45 intermediate its ends which is movable over slots 46 in plates 47 on opposing sides thereof through which the film 19 is passed. One edge of the opening 45 is diagonal to the film to better sever the same. On the upper of the plates 47 is mounted a vertical pin 48 while a similar pin 49 is carried by the cutter plate 44. A spring 50 extends between these pins to resist outward displacement of the plate, to accomplish which, an arm 51 is mounted on a shaft 52, the latter extending to the opposite side of the machine and carrying a knob 53 on its end with which to rotate the same. Rotation of shaft 52 will urge the end of the arm 51 against the rear edge of the slidable plate 44, thereby cutting a section from the film 19 which drops into the transfer box 13 through a hole 54 in its top. When the box 13 is to be removed to the developing room to process the film therein, the light excluding slide 14 is inserted into specially formed guides in the box to protect the film sections for further processing.

In referring now to the negative photographic film 55 and the mechanism for actuating the same, it will be necessary from time to time to return to the mechanism just described since for the most part but not always, the mechanism for operating the positive film 19 functions in conjunction with the mechanism for actuating the photographic film. This is true when making simultaneous exposures on the two films but it will become obvious that exposures can be made on either of the films to the exclusion of the other should an occasion require.

The photographic negative film 55 is wholly confined in its own magazine 56 in which is contained two reels 57 (Fig. 6), the film being unwound from the upper onto the lower of these reels. It is important to observe that in loading the magazine 56 no film leader is required and consequently there is no physical connection between the film and the camera per se.

To load the magazine 56, the two reels 57 are placed on spindles (not shown) and an intermediate portion 58 of the film 55 is placed against a guide plate 59 which is a stationary part of the magazine 57 at its front. This plate has an exposure orifice 60 therein through which the main image is projected onto the film through the lens barrel 61 of the camera and immediately above the orifice 60 there is provided a slot 62. The main orifice 60 and slot 62 register with corresponding openings 63 and 64 respectively in a plate 65 which is the back plate of a small auxiliary housing 66. The aligned slots 62—64 admit light to the film 55 through a small lens 67 set in the front wall of the auxiliary housing 66 to expose the serial number of the exposure in the manner to be presently explained.

To secure that part 58 of the film 55 overlying the exposure orifice 60, a rack 68 is provided to which is attached a film retaining plate 69, the latter being yieldable relative to the rack 68 by virtue of springs 70 surrounding pins 71 which are affixed at their inner ends to the plate 69 and whose opposite ends are slidable in holes in the rack 68. At each end of the rack 68 there is a pair of rollers 72 which bear upon the edges of the film, holding the latter firmly against the guide plate 59.

The rack 68 is held in place by means of a bracket 73 attached to and extending outwardly from the guide plate 59 and whose outer end 74 is turned at right angles to its body. A coiled spring 75 is affixed at one end to the rack and carries on its opposite end a disc 76. When the rack 68 is properly positioned in the magazine 56, the spring 75 is collapsed sufficiently to enable the disc 76 to be thrust under the end 74 of the bracket 73. When the disc is thus in place, a set screw 77 in the end of the bracket is rotated to bear against and hold the disc in place.

As in the case of the transfer drawer or box 13, the negative film magazine 56 is provided with a light excluding slide 78 (Figs. 1 and 2) which is slid between the film and guide plate 59 to close both the exposure orifice 60 and the slot 62 thereabove when the film magazine is to be removed from the camera to a developing room for processing the film.

The means for retaining the film magazine 56 on the camera or specifically, the auxiliary housing 66, a strip 79 is secured to a projecting portion 80 of the housing 66 to form a receptacle to receive the extended lower end of the plate 59 of the magazine. A slide 81 is movable over the upper extended end of plate 59 once the lower end is in place to hold the plate in flush parallelism with the rear plate 65 of the housing 66 and to insure against light infiltration at this point.

It is necessary to exercise care in fastening the magazine 56 in place on the housing 66 as described so that injury will not be sustained by a notching element 82 (Figs. 6, 10, 11 and 12), which extends from the housing 66 into the film magazine 56 through a small opening 83 in the guide plate 59. The purpose of this notching element is to mark the film 55 between each exposure, thus to clearly define each frame, making it possible to sever the frames without cutting into the picture thereon.

The notching arm 82 consists simply of a thin blade, the outer end of which has a recess 83 therein which engages and cuts from the edge of the film 55 a tiny section after the arcuated end of the arm has thrust past the film. A spring 84 connects the arm 82 to a wall of the housing 66 and it is the force supplied by this spring which causes the notching arm to cut cleanly into the film.

The notching arm 82 is pivoted to a bifurcated clamp 85 which latter, in turn, is mounted on an arm 86, extending from a collar 87 carried by the shaft 52 which latter, it will be recalled, actuates the blade 44 which cuts the paper film 19 in housing 11. In so mounting the notching arm 82, the latter is permitted to move outwardly from the edge of the film in its outward thrust but is moved by the spring 84 against the edge of the film as it recedes, thus cutting into and marking the film as described.

The lenses 88 and 89 mounted on the barrels 42 and 61 respectively are conventional as is likewise the viewing lens 90 therebetween. The barrels 42 and 61 are telescopic and are extended and retracted through a rack bar 91 (Fig. 1) and a pinion concealed in a small housing 92. The pinion is actuated by a shaft 93 and a knob 94 on one end thereof. When a proper focus of the lenses is obtained, further movement of the knob 94 or its shaft 93 is prevented by a locking knob 95. A shutter actuating arm 96 extends across under the lenses for operating both the lenses 88 and 89 simultaneously, although each may be individually operated, if desired, through a flexible wire 97.

When the camera is set up to take a picture, conventional studio lighting is employed to illuminate the subject but in order to expose on the film the serial numbers for identification, individual lighting is required. To accomplish this, there is provided over each lens barrel 42 and 61 a hood 98. One of the hoods conceals the lens 40 while the other conceals the lens 61. Beneath the hood overlying the lens 40 there is arranged two lamps 99 while under the other hood, a single lens 100 is disposed. The reason for this is that light of greater intensity must be provided to expose the positive film 19. The lamps 99 and 100 are energized by dry cell batteries contained in a cylindrical housing 101, through wire 102.

Figure 4:
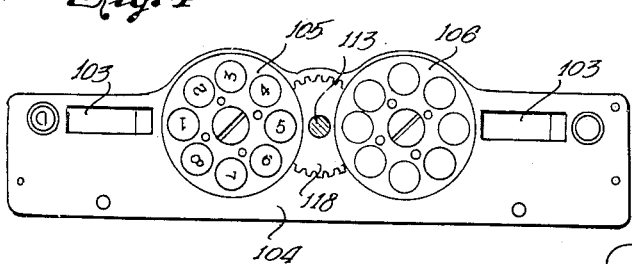
Figure 4 is a rear elevational view of the dial assembly for serially marking film exposures.
Figure 5:
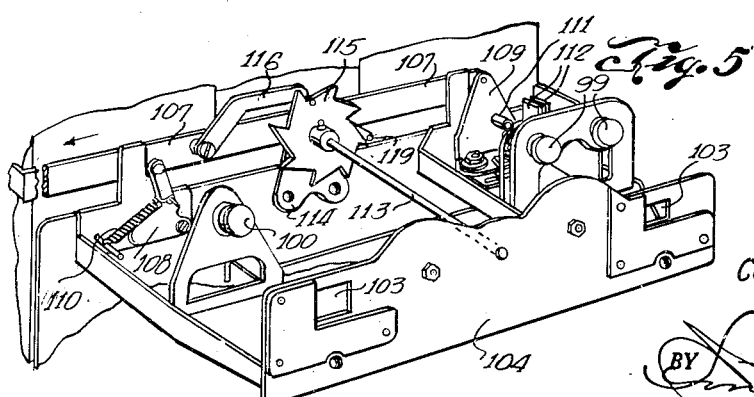
Figure 5 is a front perspective view of the trip mechanism for successively changing the positions of the dials and for illuminating the same immediately preceding their change in position.

The purpose of the lamps 99 and 100 is to illuminate serial numbers on cards inverted in frames 103 (Figs. 1, 4 and 5) in a plate 104 supported in front of the hoods 98, as well as auxiliary members borne on dials 105 and 106 rotatably mounted on the inner face of the plate 104 for projection onto the film 19 and 56 respectively through their slots 39 and 62. The numbers on the cards (not shown) which are inverted in frames 103 and 104, supplemented by the numbers on the dials 105 and 106 and which fall into successive register with the card numbers as the dials are rotated, are revealed on the film in both magazines 18 and 56 and serve as permanent identification for the pictures produced.

In order to turn the dials 105 and 106, to bring the numbers thereon into successive register with numbers on cards which are placed in frames 103, an arm 107 extends across the front portions of the housings 18 and 66 and is pivotally supported by members 108 and 109, the former being resisted in its movement by a coiled spring 110 to return the arm 107 to its original position when displaced. As the arm 107 is endwise, the members 108 and 109 are rocked on their pivots and the member 109 which carries an outwardly extending pin 111, causes this pin to come up against one of two contacts 112, causing engagement thereof and closing the circuit to the lamps 99 and 100 from the battery contained in the case 101. When pressure on the end of arm 107 is relieved, the spring 110 returns the same to its inoperative position.

It is essential that the lamps 99 and 100 be extinguished before movement is imparted to the dials 105 and 106. This is accomplished through the medium of a shaft 113, the outer end of which is journaled in the plate 104 supporting the dials 105 and 106. The inner end of this shaft is journaled in a bracket 114. A ratchet wheel 115 is carried by the shaft. Pivotally mounted on the arm 107 is a detent 116 which cooperates with the ratchet wheel to turn the shaft 113.

Each stub shaft of the dials 105 and 106 carries a small gear 117. These gears can be seen only in Figure 3. An intermediate gear 118 mounted on the shaft 113 engages each of these gears 117, causing the dials 105 and 106 to turn when the arm 107 is shifted to the right in Figure 1. As stated, however, it is important that the dials do not turn until the lamps 99 and 100 are extinguished. This is accomplished by making the detent 116 of sufficient length that it will reach well beyond the point of engagement with the ratchet wheel 115, allowing a pause during its recession to enable the contacts 112 to separate before it engages a tooth of the ratchet wheel to turn the same. When this occurs, the circuit is broken to the lamps.

In order that rotative movement of the ratchet wheel 115 and consequently the dials 105 and 106 will be controlled, a pin 119 (Fig. 5) extends outwardly from the receprocable arm 107 to engage a tooth of the ratchet wheel following rotative displacement thereof, otherwise the wheel would spin. With this arrangement, the dials are motionless while the lamps 99 and 100 are illuminated.

In operation, the film magazine 56 is removed from the camera by releasing the latch 81 and allowing the upper portion of the magazine to move outwardly on a fulcrum provided by the receptacle formed by the strips 79 (Fig. 6). This is to permit the magazine to be released from the notching blade 82 which extends through the film guide plate 59 of the magazine. When the blade 82 is thus released, the magazine is lifted upwardly to disengage it from the receptacle. Before this is done however, the light excluding slide 78 is inserted, as described.

After the exposed film has been exchanged for unexposed film, the rack 68 is inserted in the magazine and the magazine is replaced on the camera. The positive paper film magazine 18 is loaded with film 19 and the end of the latter is inserted through the slot 17 in the top 16 of housing 11 and threaded downwardly through the guide 26, between sets of rollers 28 and 29 until its lower end passes below the exposure orifice 38 in the backing plate 37.

A coiled spring belt 120 is passed over a pulley 121 mounted on the film feeder shaft 29 and another pulley 122 (Fig. 3), mounted on the end of the spindle 123 of the lowermost film reel in the magazine 56. It is apparent therefore that when the shaft 29 is turned by manipulating the feeder knob 43, the lowermost reel 57 will be turned as well as the roller 27 in the housing 11 which feeds film 19 off the roll in magazine 18.

The shaft 29 further has mounted thereon, feeding rollers 124 which are located in the auxiliary housing 66 (Fig. 6). These rollers operate in slots 125 in the guide plate 59 of the negative film magazine 56 and thus aid in feeding film 55 past the exposure orifice 60 in the plate 59.

In order that movement of film 55 in magazine 56 will be at all times synchronized with that of the positive film 19, a clutch such as shown in Figures 7, 8 and 9, is provided. This element consists of a collar 126 affixed to the feeder shaft 29 within the housing 11. The collar has an integral disc 127 thereon, in the periphery of which are two diametrically opposed slots 128. A complementary member 129 is mounted freely on the shaft 29 adjacent the disc 127 and has an annular flange 130 which embraces the perimeter of disc 127 but in which there are opposed cut-outs 131 adapted to periodically receive a finger 132 on the upper end of an arm 133. The only connection between the disc 127 and its companion member 129 is through a pin 134 on the disc which extends through a slot 135 in the member 129 and to which is connected one end of a coiled spring 136, the opposite end of the latter being connected to a pin 137 mounted on the face of member 129.

The arm 133 is pivoted intermediate its ends at 138 to one of the walls 33 in the chamber A of housing 11. The lower end of this arm terminates adjacent the cutter shaft 52 and an arm 139 mounted on this shaft is brought into engagement with the lower end of arm 133 to cause the finger 132 on its upper end to move out of engagement with a slot 128 in the disc 127. A torsion spring 140 (Fig. 7) resists the described displacement of the arm 133.

It has been stated previously that before a new frame of film 55 can be brought into position before the exposure orifice 60, the cutter shaft 52 must be actuated to cut off an exposed section of the paper film 19. The presence of the finger 132 in a notch 128 of the disc 127 locks the film feeding shaft 29 against rotation until the cutter shaft 52 is rotated. When this is done, the cutter plate 44 is actuated by the arm 51 (Fig. 13) on shaft 52 and simultaneously, arm 193 moves to engage the lower end of arm 133. The two springs 136 on the clutch instantly function to change the relative positions of the disc 127 and its complementary member 129 and the finger 132 comes to rest on the periphery of the member 129. This unlocks the shaft 29, enabling the same to be turned by means of knob 43 until the finger 132 again drops into a slot 128. The distance between slots equals the length of a frame of film 55 and since the film 19 and 55 are fed simultaneously, sections of identical length are exposed at the same time in their respective orifices 38 and 60 and while the exposed frames of film 55 are stored on the lowermost of reels 57, the exposed sections of paper film 19 are cut off and dropped into the transfer box 13 for disposition as previously described.

The described camera may, of course, be employed as a portable machine or it may be mounted on a stand or tripod for studio use. In either case however, the lenses 88 and 89 are focused through the synchronized viewing lens 90 whose chamber 141 extends rearwardly between the housings 11 and 66 (Fig. 3). Either before or after an exposure has been made on films 19 and 55, the serial numbers of the exposures are made thereon by actuating the arm 107 to first illuminate the lamps 99 and 100 and subsequently actuate the ratchet wheel 115 and discs 105 and 106 to cause the auxiliary numerals thereon to be brought in sequence into register with serially numbered cards disposed in frames 103 in the frontal plate 104, as described.

Manifestly, the construction as shown and described is capable of some modification and such modification as may be construed to fall within the scope and meaning of the appended claims is also considered to be within the spirit and intent of the invention.

What is claimed is:

1. In a camera, spaced apart housings, each having a photographic lens provided with focusing means and a shutter, a viewing lens between and of the same focal length as said photographic lenses, a magazine removably mounted on each of said housings, one of which contains photographic negative film and the other photographic paper, a guide plate for said photographic film, a guide plate for said photographic paper, each of said guide plates having an exposure orifice in alignment with said photographic lenses, and a serial numbering slot adjacent each of said orifices and isolated therefrom, a common film feeding shaft for said film and paper extending through said housings carrying feeding rolls, a shaft parallel with said feeding shaft, a cutting blade actuated thereby for cutting exposed sections of said photographic paper below its exposure orifice, means carried by said shaft for notching said photographic film simultaneously with the cutting of said photographic paper, means for locking said feeding shaft, clutch means controlled by said cutting shaft for disengaging said feeding shaft, a pair of rotatable and number carrying dials disposed forwardly of said housings, means for holding replaceable numbered cards adjacent said dials, means for illuminating said dials and cards, means for energizing said illuminating means and a manually actuated ratchet for subsequently actuating said dials to expose on said photographic paper and said photographic film through said slots the serial numbers on said cards and said dials.

2. In a camera, spaced apart housings, each having an adjustable photographic lens, a viewing lens adjacent to and having the same focal length as said photographic lenses, a magazine removably mounted on each of said housings, one of which contains a photographic negative film and the other photographic paper, a guide plate for said film and for said photographic paper, each having an exposure orifice in alignment with a photographic lens and a slot isolated therefrom, a common feeding shaft for said film and paper, means for locking said feeding shaft, a second shaft parallel with said feeding shaft, means actuated by said second shaft for disengaging said locking means, and means also carried by said second shaft for notching said photographic film between each exposure thereof and for cutting said photographic paper below its exposure orifice.

3. A camera including a pair of adjustable photographic lenses and a viewing lens of the same focal length as said photographic lenses, a pair of magazines, one of which contains a photographic negative film and the other photographic paper, a common means for feeding said paper and film simultaneously across an exposure orifice in alignment with said photographic lenses, means for locking said feeding means, means for cutting said photographic paper in sections corresponding in length to the frames of said photographic film, means actuated by said cutting means for disengaging said locking means, a card holder disposed forwardly of each of said housings, a consecutively numbered dial adjacent each card holder, illuminating means for numbered cards in said holders and said dials, and manually actuated ratchet means for rotating said dials simultaneously and for energizing said illuminating means for exposing said film and photographic paper simultaneously to said numbers to serially identify the same.

4. A camera including independent magazines, photographic paper in one of said magazines, photographic negative film in the other of said magazines, an adjustable lens for each of said magazines, a viewing lens between and of the same focal length as said first lenses, means for exposing a limited area of said film and paper simultaneously, means for advancing said film and paper at an equal rate across said exposure area simultaneously, means for locking said advancing means after each exposure, means for cutting exposed sections from said photographic paper of lengths equal to that of the frames of said photographic film, means actuated by said cutting means for notching said film between each frame thereof, and means also actuated by said cutting means for releasing said locking means.

5. In a simultaneous exposure camera, a pair of magazines, each having a complementary adjustable photographic lens, photographic film in one of said magazines, photographic paper in the companion magazine, means for exposing predetermined areas of said photographic paper and film simultaneously, means for advancing said paper and film at an equal rate past an exposure orifice, means for cutting exposed sections from said photographic paper of a length equal to that of the frames of said photographic film, means for locking said advancing means after each operation thereof, a film notching blade actuated by said cutting means for marking said photographic film between the frames thereof, means also actuated by said cutting means for disengaging said locking means and means for serially numbering said photographic paper and film simultaneously separate from said exposures.

6. A camera as set forth in claim 5, further defined in that the magazine containing the photographic negative film wholly encloses said film, the latter being operated by means exteriorly of said magazine.

7. A photographic camera as set forth in claim 5, further defined in that a transfer box is provided to receive severed sections of exposed photographic paper, and a light excluding slide adapted to close said transfer box to protect said photographic paper for processing.

8. A camera as set forth in claim 5, further defined in that the means for serially numbering the photographic paper and film consists of a pair of frames for receiving numbered cards and a progressively numbered dial rotatably disposed adjacent each of said frames, a shaft carrying means for operating said dials simultaneously to bring their numbers successively into alignment with said frames, a ratchet wheel on said shaft, a reciprocable arm, a detent pivoted to said arm for actuating said ratchet wheel and illuminating means energized by said arm prior to the actuation of said dials.

CARL L. MOURFIELD.

REFERENCES CITED

The following references are of record in the file of this patent:

UNITED STATES PATENTS

| Number | Name | Date |
| --- | --- | --- |
| 1,743,616 | Nolan | Jan. 14, 1930 |
| 1,940,187 | Salchow | Dec. 19, 1933 |
| 1,986,522 | Owens | Jan. 1, 1935 |
| 2,095,849 | Wittel | Oct. 12, 1937 |
| 2,312,683 | Zollinger | Mar. 2, 1943 |
| 2,321,156 | Powers | June 8, 1943 |